(12) United States Patent
Zhou et al.

(10) Patent No.: US 9,635,364 B2
(45) Date of Patent: Apr. 25, 2017

(54) CODING UNIT QUANTIZATION PARAMETERS IN VIDEO CODING

(71) Applicant: TEXAS INSTRUMENTS INCORPORATED, Dallas, TX (US)

(72) Inventors: Minhua Zhou, San Diego, CA (US); Mehmet Demircin, Dallas, TX (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/531,632

(22) Filed: Nov. 3, 2014

(65) Prior Publication Data

US 2015/0049805 A1    Feb. 19, 2015

Related U.S. Application Data

(63) Continuation of application No. 13/093,715, filed on Apr. 25, 2011.

(Continued)

(51) Int. Cl.
  *H04N 7/26* (2006.01)
  *H04N 19/124* (2014.01)
  (Continued)

(52) U.S. Cl.
  CPC ....... *H04N 19/124* (2014.11); *H04N 5/23293* (2013.01); *H04N 5/369* (2013.01);
  (Continued)

(58) Field of Classification Search
  CPC ........... H04N 19/00951; H04N 19/124; H04N 19/117; H04N 19/13; H04N 19/15; H04N 19/159; H04N 19/167; H04N 19/172; H04N 19/176; H04N 19/184; H04N 19/196; H04N 19/43; H04N 19/463; H04N 19/60; H04N 19/61; H04N 5/23293; H04N 5/369
  (Continued)

(56) References Cited

U.S. PATENT DOCUMENTS

2005/0002454 A1*  1/2005  Ueno ................. H04N 19/176
                                              375/240.03
2007/0280348 A1  12/2007  Tokumitsu et al.
(Continued)

FOREIGN PATENT DOCUMENTS

CN   WO2012062161 A1 *  5/2012
WO   WO 2012042890     4/2012
WO   WO 2012062161     5/2012

OTHER PUBLICATIONS

Kobayashi et. al., Sub-LCU level delta QP signaling from IDS.*
(Continued)

*Primary Examiner* — Gims Philippe
*Assistant Examiner* — Joseph Becker
(74) *Attorney, Agent, or Firm* — Peter K. McLarty; Charles A. Brill; Frank D. Cimino

(57) ABSTRACT

A method is provided that includes receiving a coded largest coding unit in a video decoder, wherein the coded largest coding unit includes a coded coding unit structure and a plurality of coded quantization parameters, and decoding the coded largest coding unit based on the coded coding unit structure and the plurality of coded quantization parameters.

18 Claims, 9 Drawing Sheets

Related U.S. Application Data

(60) Provisional application No. 61/331,216, filed on May 4, 2010, provisional application No. 61/431,889, filed on Jan. 12, 2011, provisional application No. 61/469,518, filed on Mar. 30, 2011.

(51) Int. Cl.

| | | |
|---|---|---|
| *H04N 19/176* | (2014.01) | |
| *H04N 19/196* | (2014.01) | |
| *H04N 19/463* | (2014.01) | |
| *H04N 19/167* | (2014.01) | |
| *H04N 19/60* | (2014.01) | |
| *H04N 19/172* | (2014.01) | |
| *H04N 19/184* | (2014.01) | |
| *H04N 19/117* | (2014.01) | |
| *H04N 19/13* | (2014.01) | |
| *H04N 19/15* | (2014.01) | |
| *H04N 19/159* | (2014.01) | |
| *H04N 19/43* | (2014.01) | |
| *H04N 19/61* | (2014.01) | |
| *H04N 5/232* | (2006.01) | |
| *H04N 5/369* | (2011.01) | |

(52) U.S. Cl.
CPC .......... *H04N 19/117* (2014.11); *H04N 19/13* (2014.11); *H04N 19/15* (2014.11); *H04N 19/159* (2014.11); *H04N 19/167* (2014.11); *H04N 19/172* (2014.11); *H04N 19/176* (2014.11); *H04N 19/184* (2014.11); *H04N 19/196* (2014.11); *H04N 19/43* (2014.11); *H04N 19/463* (2014.11); *H04N 19/60* (2014.11); *H04N 19/61* (2014.11)

(58) Field of Classification Search
USPC .................................................... 375/240.03
See application file for complete search history.

(56) References Cited

U.S. PATENT DOCUMENTS

| | | | |
|---|---|---|---|
| 2009/0213930 | A1 | 8/2009 | Ye et al. |
| 2010/0086029 | A1 | 4/2010 | Chen et al. |
| 2010/0086030 | A1 | 4/2010 | Chen et al. |
| 2010/0086031 | A1 | 4/2010 | Chen et al. |
| 2010/0086032 | A1 | 4/2010 | Chen et al. |
| 2011/0194613 | A1* | 8/2011 | Chen et al. ............ 375/240.24 |
| 2011/0255597 | A1* | 10/2011 | Mihara et al. .......... 375/240.16 |

OTHER PUBLICATIONS

Detlev Marpe et al, "Video Compression Using Nested Quadtree Structures, Leaf Merging and Improved Techniques for Motion Representation and Entropy Coding", IEEE Transactions on Circuits and Systems for Video Technology, vol. 20, No. 12, Dec. 2010, published Nov. 15, 2010, pp. 1676-1687.

Ken McCann et al, "Samsung's Response to the Call for Proposals on Video Compression Technology", JCTVC-A124, Apr. 15-23, 2010, pp. 1-42, Joint Collaborative Team on Video Coding (JCT-VC) of ITU-T SG16 WP3 and ISO/IEC JTC1/SC29/WG11, Dresden, Germany.

Chao Pang et al, "Improved dQP Calculation Method", JCTVC-E217, Mar. 16-23, 2011, pp. 1-3, Joint Collaborative Team on Video Coding (JCT-VC) of ITU_T SG16 WP3 and ISO/IEC JTC1/SC29/WG11, Geneva, Switzerland.

Kazushi Sato and Jun Xu, "Preliminary Implementation on Sub-LCU-Level DeltaQP", JCTVC-E220r2, Mar. 16-23, 2011, pp. 1-5, Joint Collaborative Team on Video Coding (JCT-VC) of ITU-T SG16 WP3 and ISO/IEC JTC1/SC29/WG11, Geneva, Switzerland.

Muhammed Coban et al, "CU-Level QP Prediction", JCTVC-E391, Mar. 16-23, 2011, pp. 1-3, Joint Collaborative Team on Video Coding (JCT-VC) of ITU-T SG16 WP3 and ISO/IEC JTC1/SC29/WG11, Geneva, Switzerland.

Hirofumi Aoki et al, "Prediction-based QP Derivation", JCTVC-E215, pp. 1-11, Joint Collaborative Team on Video Coding (JCT-VC) of ITU-T SG16 WP3 and ISO/IEC JTC1/SC29/WG11, Geneva, Switzerland.

Chao Pang et al, "Sub-LCU QP Representation", JCTVC-E436, Mar. 16-23, 2011, pp. 1-5, Joint Collaborative Team on Video Coding (JCT-VC) of ITU-T SG16 WP3 and ISO/IEC JTC1/SC29/WG11, Geneva, Switzerland.

Masaaki Kobayashi and Masato Shima, "Sub-LCU Level Delta QP Signaling", JCTVC-E198, pp. 1-9, Mar. 16-23, 2011, Joint Collaborative Team on Video Coding (JCT-VC) of ITU-T SG16 WP3 and ISO/IEC JTC1/SC29/WG11, Geneva, Switzerland.

Masato Shima et al, "Support for Sub-LCU-Level QP in HEVC", JCTVC-E202r1, pp. 1-5, Mar. 16-23, 2011, Joint Collaborative Team on Video Coding (JCT-VC) of ITU-T SG16 WP3 and ISO/IEC JTC1/SC29/WG11, Geneva, Switzerland.

Tzu-Der Chuang et al, "AhG Quantization: Sub-LCU Delta QP", JCTVC-E051, pp. 1-6, Mar. 16-23, 2011, Joint Collaborative Team on Video Coding (JCT-VC) of ITU-T SG16 WP3 and ISO/IEC JTC1/SC29/WG11, Geneva, Switzerland.

Thomas Wiegand et al, "WD3: Working Draft 3 of High-Efficiency Video Coding", JCTVC-E603, pp. 1-168, Mar. 16-23, 2011, Joint Collaborative Team on Video Coding (JCT-VC) of ITU-T SG16 WP3 and ISO/IEC JTC1/SC29/WG11, Geneva, Switzerland.

Madhukar Budagavi and Minhua Zhou, "Delta QP Signaling at Sub-LCU Level", JCTVC-D038, pp. 1-5, Jan. 20-28, 2011, Joint Collaborative Team on Video Coding (JCT-VC) of ITU-T SG16 WP3 and ISO/IEC JTC1/SC29/WG11, Daegu, South Korea.

* cited by examiner

FIG. 10

CODING UNIT QUANTIZATION PARAMETERS IN VIDEO CODING

CROSS-REFERENCE TO RELATED APPLICATIONS

This application is a continuation of application Ser. No. 13/093,715, filed Apr. 25, 2011, which claims benefit of U.S. Provisional Patent Application No. 61/331,216, filed May 4, 2010, of U.S. Provisional Patent Application No. 61/431,889, filed Jan. 12, 2011, and of U.S. Provisional Patent Application No. 61/469,518, filed Mar. 30, 2011, all of which are incorporated herein by reference in their entirety.

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, video gaming devices, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression, i.e., video coding, is an essential enabler for digital video products as it enables the storage and transmission of digital video. In general, current video coding standards define video compression techniques that apply prediction, transformation, quantization, and entropy coding to sequential blocks of pixels, i.e., macroblocks, in a video sequence to compress, i.e., encode, the video sequence. A macroblock is defined as a 16×16 rectangular block of pixels in a frame or slice of a video sequence where a frame is defined to be a complete image captured during a known time interval.

A quantization parameter (QP) may be used to modulate the step size of the quantization for each macroblock. For example, in H.264/AVC, quantization of a transform coefficient involves dividing the coefficient by a quantization step size. The quantization step size, which may also be referred to as the quantization scale, is defined by the standard based on the QP value, which may be an integer within some range 0 . . . 51. A step size for a QP value may be determined, for example, using a table lookup and/or by computational derivation.

The quality and bit rate of the compressed bit stream is largely determined by the QP value selected for quantizing each macroblock. That is, the quantization step size (Qs) used to quantize a macroblock regulates how much spatial detail is retained in a compressed macroblock. The smaller the Qs, the more retention of detail and the better the quality but at the cost of a higher bit rate. As the Qs increases, less detail is retained and the bit rate decreases but at the cost of increased distortion and loss of quality.

BRIEF DESCRIPTION OF THE DRAWINGS

Particular embodiments will now be described, by way of example only, and with reference to the accompanying drawings:

FIG. 10 shows an example in accordance with one or more embodiments;

DETAILED DESCRIPTION OF EMBODIMENTS OF THE INVENTION

Figure 1:
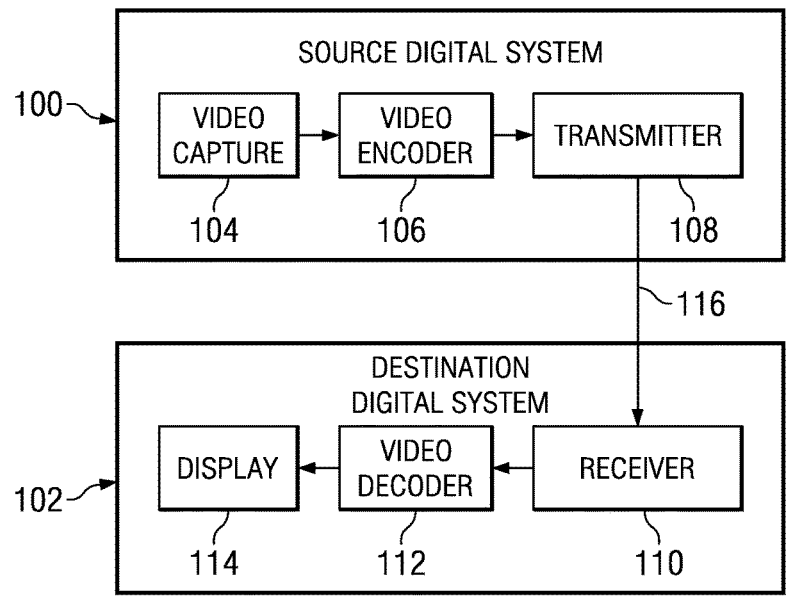
FIG. 1 shows a block diagram of a digital system in accordance with one or more embodiments.

Specific embodiments of the invention will now be described in detail with reference to the accompanying figures. Like elements in the various figures are denoted by like reference numerals for consistency.

As was previously discussed, in current video coding standards such as H.264/AVC, the coding operations of prediction, transformation, quantization, and entropy coding are performed based on fixed size 16×16 blocks referred to as macroblocks. Further, a quantization parameter is generated for each macroblock with no provision for doing so for larger or smaller blocks. For larger frame sizes, e.g., frame sizes used for high definition video, using a larger block size for the block-based coding operations may provide better coding efficiency and/or reduce data transmission overhead. For example, a video sequence with a 1280×720 frame size and a frame rate of 60 frames per second is 36 times larger and 4 times faster than a video sequence with a 176×144 frame size and a frame rate of 15 frames per second. A block size larger than 16×16 would allow a video encoder to take advantage of the increased spatial and/or temporal redundancy in the former video sequence. Such larger block sizes are currently proposed in the emerging next generation video standard referred to High Efficiency Video Coding (HEVC). HEVC is the proposed successor to H.264/MPEG-4 AVC (Advanced Video Coding), currently under development by a Joint Collaborative Team on Video Coding (JCT-VC) established by the ISO/IEC Moving Picture Experts Group (MPEG) and ITU-T Video Coding Experts Group (VCEG).

However, an increased block size may adversely affect rate control. That is, many rate control techniques manage QP on a block-by-block basis according to the available space in a hypothetical transmission buffer. Increasing the block size reduces the granularity at which rate control can adjust the value of QP, thus possibly making rate control more difficult and/or adversely affecting quality. Further, reducing the granularity at which QP can change by increasing the block size impacts the visual quality performance of perceptual rate control techniques that adapt the QP based on the activity in a block.

Embodiments described herein provide for block-based video coding with a large block size, e.g., larger than 16×16, in which multiple quantization parameters for a single block may be generated. More specifically, a picture (or slice) is divided into non-over-lapping blocks of pixels referred to as largest coding units (LCU). As used herein, the term "picture" refers to a frame or a field of a frame. A frame is a complete image captured during a known time interval. A slice is a subset of sequential LCUs in a picture. An LCU is the base unit used for block-based coding. That is, an LCU plays a similar role in coding as the prior art macroblock, but it may be larger, e.g., 32×32, 64×64, 128×128, etc. For purposes of quantization, the LCU is the largest unit in a picture for which a quantization parameter (QP) may be generated.

As part of the coding process, various criteria, e.g., rate control criteria, complexity considerations, rate distortion constraints, etc., may be applied to partition an LCU into coding units (CU). A CU is a block of pixels within an LCU and the CUs within an LCU may be of different sizes. After the CU partitioning. i.e., the CU structure, is identified, a QP is generated for each CU. Block-based coding is then applied to the LCU to code the CUs. As part of the coding, the QPs are used in the quantization of the corresponding CUs. The CU structure and the QPs are also coded for communication, i.e., signaling, to a decoder.

In some embodiments, QP values are communicated to a decoder in a compressed bit stream as delta QP values. Techniques for computing the delta QPs and for controlling the spatial granularity at which delta QPs are signaled are also provided. In some embodiments, more than one technique for computing the delta QP values may be used in coding a single video sequence. In such embodiments, the technique used may be signaled in a compressed bit stream at the appropriate level, e.g., sequence, picture, slice, and/or LCU.

FIG. 1 shows a block diagram of a digital system in accordance with one or more embodiments. The system includes a source digital system 100 that transmits encoded video sequences to a destination digital system 102 via a communication channel 116. The source digital system 100 includes a video capture component 104, a video encoder component 106 and a transmitter component 108. The video capture component 104 is configured to provide a video sequence to be encoded by the video encoder component 106. The video capture component 104 may be for example, a video camera, a video archive, or a video feed from a video content provider. In some embodiments, the video capture component 104 may generate computer graphics as the video sequence, or a combination of live video, archived video, and/or computer-generated video.

The video encoder component 106 receives a video sequence from the video capture component 104 and encodes it for transmission by the transmitter component 108. The video encoder component 106 receives the video sequence from the video capture component 104 as a sequence of frames, divides the frames into LCUs, and encodes the video data in the LCUs. The video encoder component 106 may be configured to apply one or more techniques for generating and encoding multiple quantization parameters for an LCU during the encoding process as described herein. Embodiments of the video encoder component 106 are described in more detail below in reference to FIGS. 3A and 3B.

The transmitter component 108 transmits the encoded video data to the destination digital system 102 via the communication channel 116. The communication channel 116 may be any communication medium, or combination of communication media suitable for transmission of the encoded video sequence, such as, for example, wired or wireless communication media, a local area network, or a wide area network.

The destination digital system 102 includes a receiver component 110, a video decoder component 112 and a display component 114. The receiver component 110 receives the encoded video data from the source digital system 100 via the communication channel 116 and provides the encoded video data to the video decoder component 112 for decoding. The video decoder component 112 reverses the encoding process performed by the video encoder component 106 to reconstruct the LCUs of the video sequence. The video decoder component may be configured to apply one or more techniques for decoding multiple quantization parameters for an LCU during the decoding process as described herein. Embodiments of the video decoder component 112 are described in more detail below in reference to FIG. 9.

The reconstructed video sequence is displayed on the display component 114. The display component 114 may be any suitable display device such as, for example, a plasma display, a liquid crystal display (LCD), a light emitting diode (LED) display, etc.

In some embodiments, the source digital system 100 may also include a receiver component and a video decoder component and/or the destination digital system 102 may include a transmitter component and a video encoder component for transmission of video sequences both directions for video steaming, video broadcasting, and video telephony. Further, the video encoder component 106 and the video decoder component 112 may perform encoding and decoding in accordance with one or more video compression standards. The video encoder component 106 and the video decoder component 112 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

As was previously mentioned, an LCU may be partitioned into coding units (CU) during the coding process. For simplicity of explanation in describing embodiments, a recursive quadtree structure is assumed for partitioning of LCUs into CUs. One of ordinary skill in the art will understand embodiments in which other partitioning structures are used. In the recursive quadtree structure, a CU may be square. Accordingly, an LCU is also square. A picture is divided into non-overlapped LCUs. Given that a CU is square, the CU structure within an LCU can be a recursive quadtree structure adapted to the frame. That is, each time a CU (or LCU) is partitioned, it is divided into four equal-sized square blocks. Further, a given CU can be characterized by the size of the LCU and the hierarchical depth of the LCU where the CU occurs. The maximum hierarchical depth is determined by the size of the smallest CU (SCU) permitted.

Figure 2:
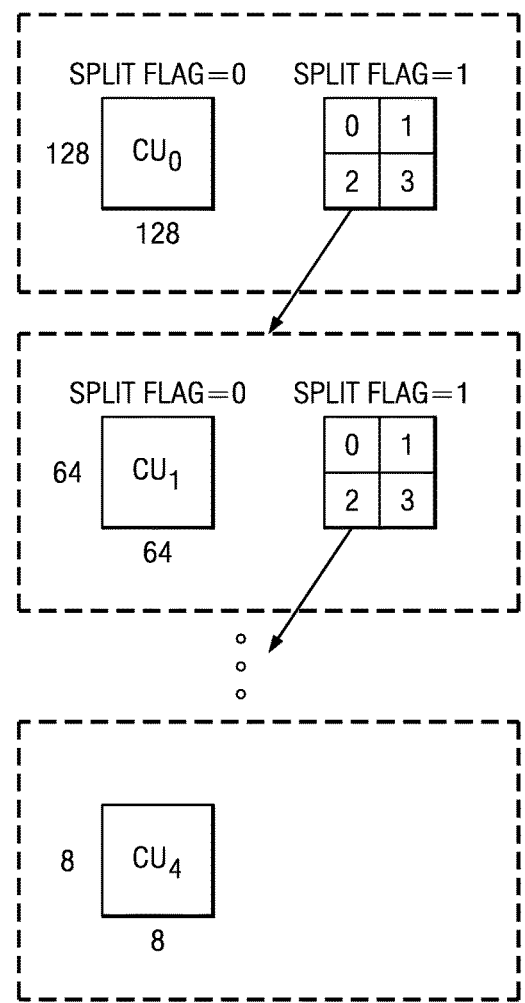
FIG. 2 shows an example of a recursive quadtree structure in accordance with one or more embodiments.

FIG. 2 shows an example of a recursive quadtree structure in which the LCU is assumed to be 128×128 and the SCU is assumed to be 8×8. With these assumptions, the maximum hierarchical depth of the quadtree structure is 5. Further, five possible CU sizes are allowed: 128×128, 64×64, 32×32, 16×16, and 8×8. If the LCU is assumed to be 64×64 and the SCU is assumed to be 8×8, the maximum hierarchical depth is 4 and four possible CU sizes are allowed: 64×64, 32×32, 16×16, and 8×8.

Figure 3A:
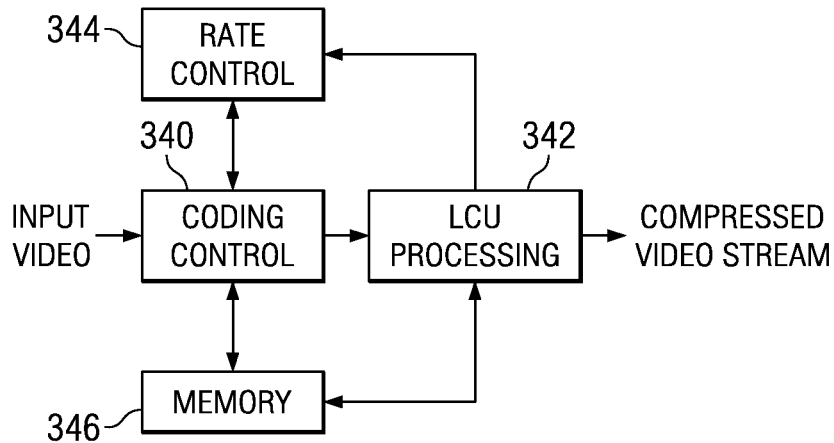
FIGS. 3A and 3B show block diagrams of a video encoder in accordance with one or more embodiments.
Figure 3B:
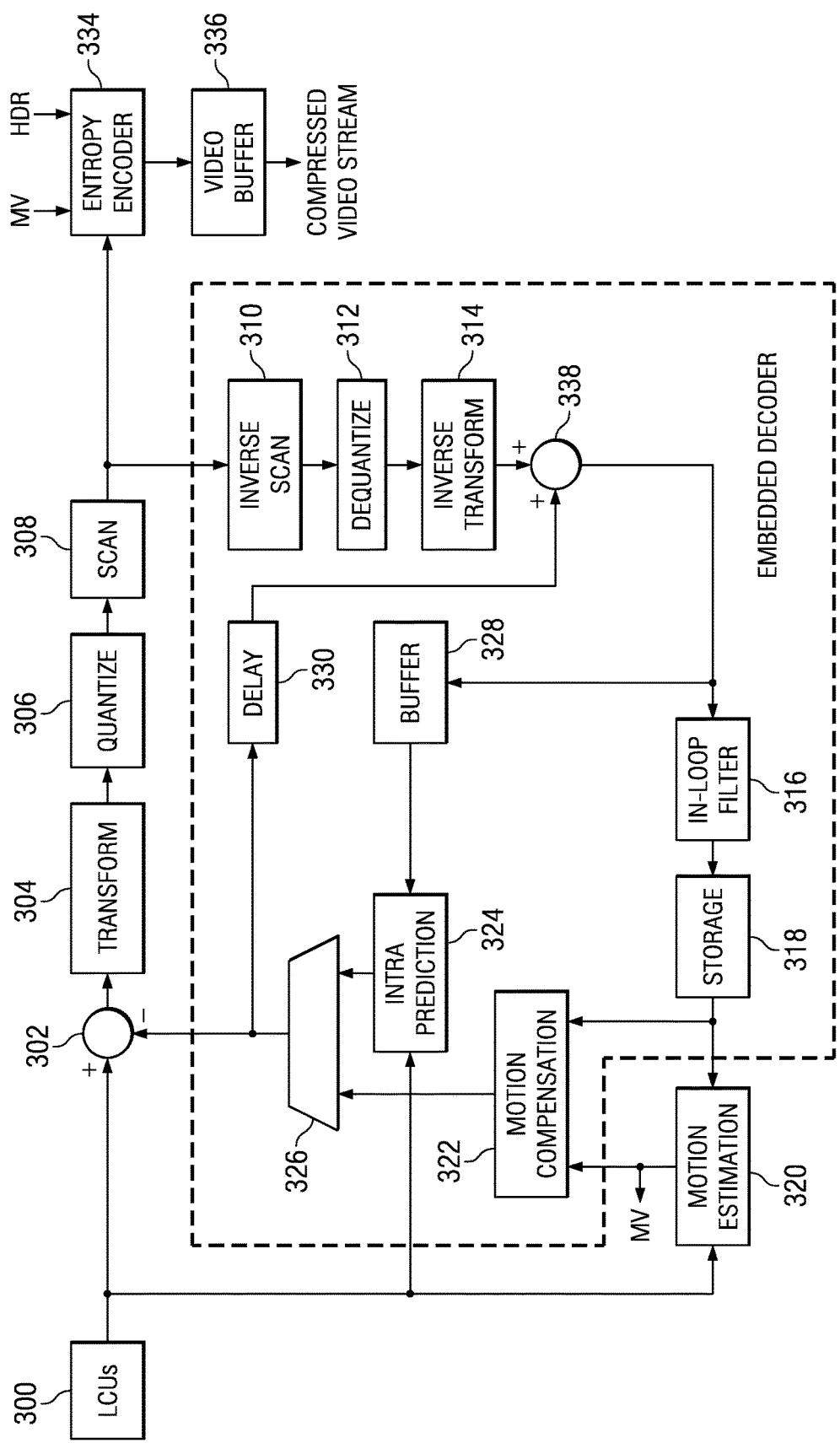

FIGS. 3A and 3B show block diagrams of a video encoder, e.g., the video encoder 106 of FIG. 1, configured to apply one or more techniques for generating and encoding multiple quantization parameters for an LCU as described herein. FIG. 3A shows a high level block diagram of the video encoder and FIG. 3B shows a block diagram of the LCU processing component 342 of the video encoder.

As shown in FIG. 3A, a video encoder includes a coding control component 340, an LCU processing component 342, a rate control component 344, and a memory 346. An input digital video sequence is provided to the coding control component 340. The memory 346 may be internal memory, external memory, or a combination thereof. The coding control component 340 sequences the various operations of the video encoder. For example, the coding control component 340 performs any processing on the input video sequence that is to be done at the frame level, such as determining the coding type (I, P, or B) of a picture based on the high level coding structure, e.g., IPPP, IBBP, hierarchical-B, and dividing a frame into LCUs for further processing. LCU size and SCU size may be different in different embodiments of the video encoder. Further, the LCU size and SCU size may be signaled at the sequence, picture, and/or slice level. The coding control component 340 also interacts with the rate control component 344 to determine an initial coding unit structure and initial QPs for each LCU.

The rate control component 344 receives an LCU from the coding control component 340 and applies various criteria to the LCU to determine one or more QPs to be used by the LCU processing component 342 in coding the LCU. More specifically, the rate control component 344 partitions the LCU into CUs of various sizes within the recursive quadtree structure based on the various criteria to determine the granularity at which QPs should be applied and then computes a QP for each CU that is not further subdivided, i.e., for each coding unit that is a leaf node in the quadtree. The CU structure of the LCU and the QPs are provided to the coding control component 340.

The QPs applied to an LCU during the coding of the LCU will be signaled in the compressed bit stream. To minimize the amount of information signaled in the compressed bits stream, it may be desirable to constrain the granularity at which QPs may be applied in an LCU. Recall that the SCU size sets the size of the smallest CU in the recursive quadtree structure. In some embodiments, a minimum QP CU size may be specified in addition to the LCU and SCU sizes. In such embodiments, the smallest CU that the rate control component 344 can use in partitioning an LCU is limited by the minimum QP CU size rather than the SCU size. Thus, the minimum QP CU size may be set to sizes larger than the SCU to constrain the granularity at which QPs may be applied. For example, if the LCU is assumed to be 64×64 and the SCU is assumed to be 8×8, the four possible CU sizes allowed in the recursive quadtree structure are 64×64, 32×32, 16×6, and 8×8. Without the minimum QP CU size constraint, the rate control component 344 can generate QPs for CUs as small as 8×8. However, if a minimum QP CU size of 16×16 is specified, the rate control component 344 can generate QPs for CUs as small as 16×16 but no smaller. The minimum QP CU size may be set at the sequence, picture, slice, and/or LCU level and signaled in the compressed bit stream accordingly.

Figure 4:
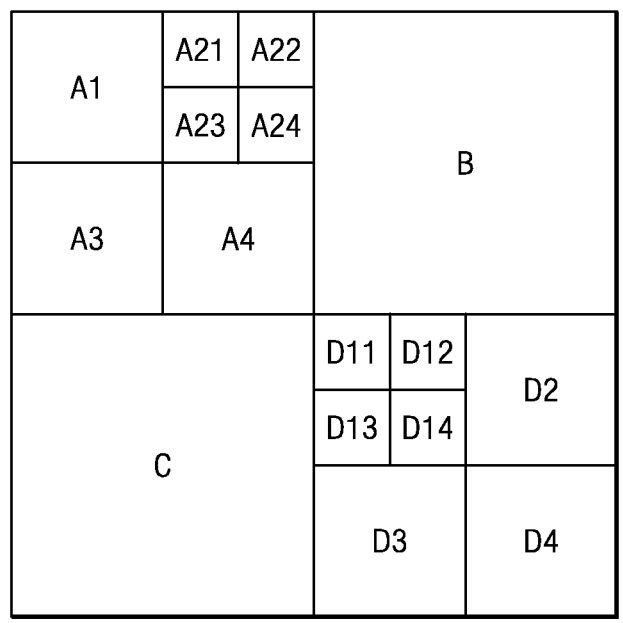
FIGS. 4-8 show examples in accordance with one or more embodiments.

FIG. 4 shows an example CU partitioning of an LCU. In this example, the LCU is partitioned into 4 CUs, A, B, C, and D. CU A is further partitioned into four CUs, A1, A2, A3, and A4 and CU D is further partitioned into four CUs, D1, D2, D3, and D4. CUs A2 and D1 are also further partitioned into four CUs, respectively A21, A22, A23, and A24 and D11, D12, D13, and D14. The rate control component 344 computes a QP for each of the CUs that is not further sub-divided, i.e., for A1, A21, A22, A23, A24, A3, A4, B, C, D11, D12, D13, D14, D2, D3, and D4.

Referring again to FIG. 3A, any suitable criteria may be used by rate control component 344, such as, for example, perceptual rate control constraints, target bit rate constraints, rate-distortion optimization constraints, and complexity considerations, alone or in any combination. For example, the rate control component 344 may determine the CU partitioning and corresponding QPs at least in part based on the spatial characteristics of the LCU. As is well known, if a region of a picture is smooth, quantization errors can be more visible to the human eye whereas if a region is busy (e.g., high textured), any quantization error will likely not be visible. The rate control component 344 may determine the activity in an LCU and then partition the LCU into CU sizes based on the locations/levels of the activity. An activity measure for a region of an image may be determined, for example, based on edge information, texture information, etc. The goal would be to assign lower QP values to flat regions (regions with little to no activity) to reduce quantization error and to assign higher QP values to busy regions (regions with high activity) as the quantization error will be hidden.

For example, assume an image in which the top half is sky and the bottom half is trees. In top of the image, most of the region is totally flat, so a low QP value should be used. It may be possible to use one QP value for an entire LCU in that part of the image as an LCU may be only sky. In the bottom half of the image, most of the region is busy, so a higher QP value can be used. Further, it may be possible to use one QP value for an entire LCU in that region, as an LCU may have only trees.

However, there will be transition regions in which LCUs will have both sky and trees. In such LCUs, there may be regions that are sky and regions that are trees. Such an LCU may be partitioned into CUs sized based on activity (within the limits of the quadtree coding structure). For example, an LCU may be divided into four CUs A, B, C, and D, and the activity level in areas of each CU may then analyzed. If a CU, say CU A, has regions of widely varying activity levels, then CU A may be further divided into four CUs, A1, A2, A3, and A4 in an attempt to reduce the variance in activity level over the area where a QP will be applied. These four CUs may each also be further divided into four CUs based on activity. Once the CU partitioning is complete, QP values may then be computed for each CU.

The coding control component 340 provides information regarding the initial LCU CU structure and the QPs determined by the rate control component 344 to the various components of the LCU processing component 342 as needed. For example, the coding control component may provide the LCU and SCU size to the entropy encoder component 340 for inclusion in the compressed video stream at the appropriate point. In another example, the coding control component 340 may generate a quantization parameter array for use by the quantize component 306 and store the quantization parameter array in the memory 346. The size of the quantization parameter array may be determined based on the maximum possible number of CUs in an LCU. For example, assume the size of the SCU is 8×8 and the size of the LCU is 64×64. Thus, the maximum possible number of CUs in an LCU is 64. The quantization parameter array is sized to hold a QP for each of these 64 possible coding units, i.e., is an 8×8 array. The QPs computed by the rate control component 344 are mapped into this array based on the CU structure. As is explained in more detail herein in reference to the quantize component 306, a QP for any size CU in the LCU may be located in this array using the coordinates of the upper left hand corner of the CU in the LCU.

Figure 5:
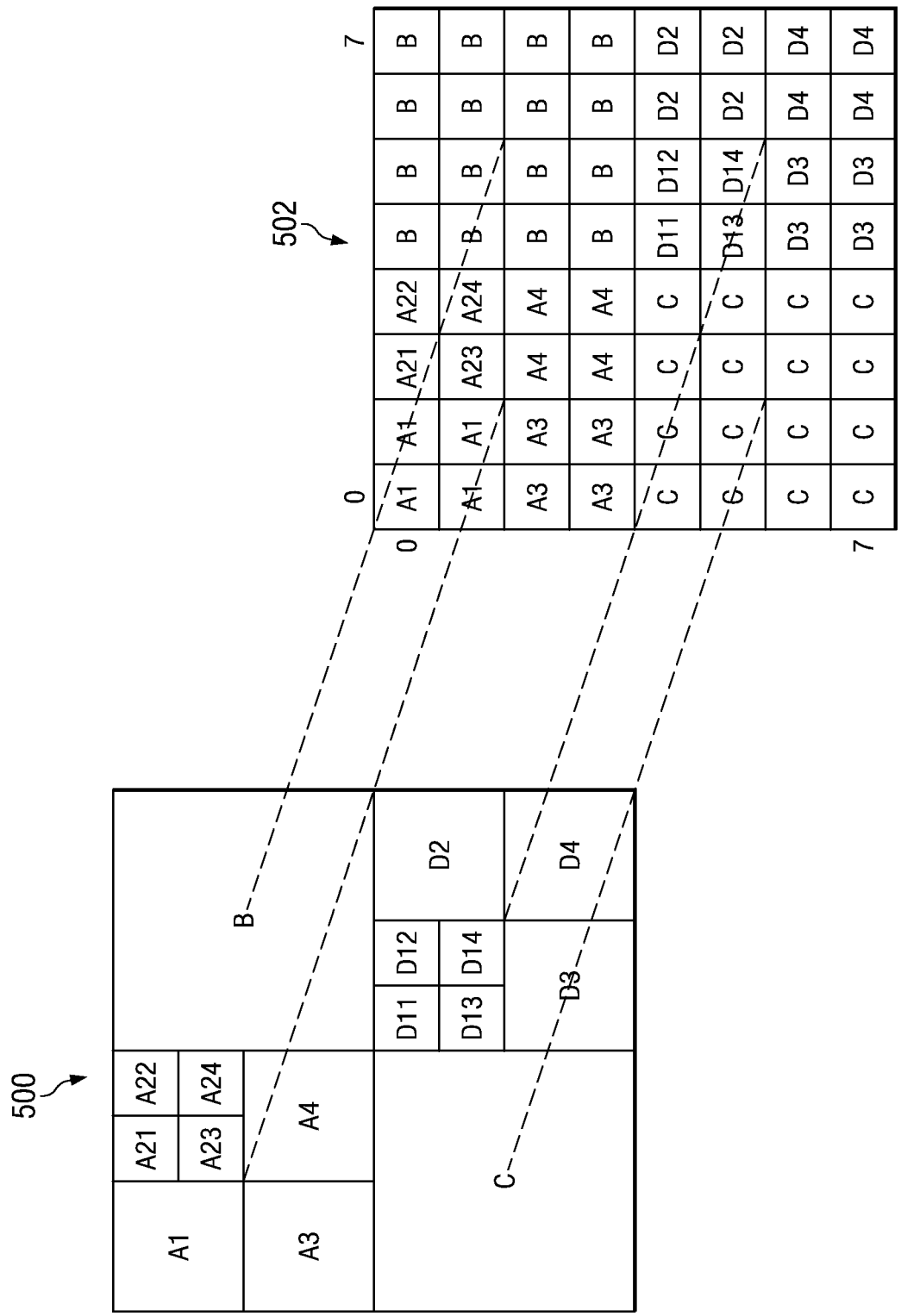

FIG. 5 shows an example of mapping QPs into a quantization parameter array 502 based on the CU structure 500. The CU structure assumes a 64×64 LCU. In the quantization parameter array 502, the presence of a CU identifier, e.g., A1, C, D11, etc., in an array cell represents the QP parameter for that CU. For example, the QP for CU A1 is in locations (0,0), (0,1), (1,0), and (1,1), the QP for CU D11 is in location (4,4), and the QP for CU C is in locations (4, 0), (4, 1), (4, 2), (4, 3), (5, 0), (5, 1), (5, 2), (5, 3), (6, 0), (6, 1), (6, 2), (6, 3), (7, 0), (7, 1), (7, 2), and (7, 3).

Referring again to FIG. 3A, the LCU processing component 342 receives LCUs of the input video sequence from the coding control component 340 and encodes the LCUs to generate the compressed video stream. As previously mentioned, the LCU processing component 342 also receives information regarding the CU structure and QPs of an LCU as determined by the rate control component 344. The CUs in the CU structure of an LCU may be processed by the LCU processing component 342 in a depth-first Z-scan order. For example, in the LCU of FIG. 4, the CUs would be scanned in the following order: A1→A21→A21→A22→A23→A3→A4→B→C→D11→D12→D13→D14→D2→D3→D4.

FIG. 3B shows the basic coding architecture of the LCU processing component 342. The LCUs 300 from the coding control unit 340 are provided as one input of a motion estimation component 320, as one input of an intra prediction component 324, and to a positive input of a combiner 302 (e.g., adder or subtractor or the like). Further, although not specifically shown, the prediction mode of each picture as selected by the coding control component 340 is provided to a mode selector component, and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion estimation information to the motion compensation component 322 and the entropy encoder 334. More specifically, the motion estimation component 320 performs tests on CUs in an LCU based on multiple temporal prediction modes using reference data from storage 318 to choose the best motion vector(s)/prediction mode based on a coding cost. To perform the tests, the motion estimation component 320 may begin with the CU structure provided by the coding control component 340. The motion estimation component 320 may divide each CU indicated in the CU structure into prediction units according to the unit sizes of prediction modes and calculate the coding costs for each prediction mode for each CU.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. As will be explained below in reference to the quantizer component 306, any changes made to the CU structure do not affect how the QPs computed by the rate control component 344 are applied. If the motion estimation component 320 changes the initial CU structure, the modified CU structure is communicated to other components in the LCU processing component 342 that need the information.

The motion estimation component 320 provides the selected motion vector (MV) or vectors and the selected prediction mode for each inter predicted CU to the motion compensation component 323 and the selected motion vector (MV) to the entropy encoder 334. The motion compensation component 322 provides motion compensated inter prediction information to a selector switch 326 that includes motion compensated inter predicted CUs and the selected temporal prediction modes for the inter predicted CUs. The coding costs of the inter predicted CUs are also provided to the mode selector component (not shown).

The intra prediction component 324 provides intra prediction information to the selector switch 326 that includes intra predicted CUs and the corresponding spatial prediction modes. That is, the intra prediction component 324 performs spatial prediction in which tests based on multiple spatial prediction modes are performed on CUs in an LCU using previously encoded neighboring CUs of the picture from the buffer 328 to choose the best spatial prediction mode for generating an intra predicted CU based on a coding cost. To perform the tests, the intra prediction component 324 may begin with the CU structure provided by the coding control component 340. The intra prediction component 324 may divide each CU indicated in the CU structure into prediction units according to the unit sizes of the spatial prediction modes and calculate the coding costs for each prediction mode for each CU.

For coding efficiency, the intra prediction component 324 may also decide to alter the CU structure by further partitioning one or more of the CUs in the CU structure. That is, when choosing the best prediction modes, in addition to testing with the initial CU structure, the intra prediction component 324 may also chose to divide the larger CUs in the initial CU structure into smaller CUs (within the limits of the recursive quadtree structure), and calculate coding costs at lower levels in the coding hierarchy. As will be explained below in reference to the quantizer component 306, any changes made to the CU structure do not affect how the QP values computed by the rate control component 344 are applied. If the intra prediction component 324 changes the initial CU structure, the modified CU structure is communicated to other components in the LCU processing component 342 that need the information. Although not specifically shown, the spatial prediction mode of each intra predicted CU provided to the selector switch 326 is also provided to the transform component 304. Further, the coding costs of the intra predicted CUs are also provided to the mode selector component.

The selector switch 326 selects between the motion-compensated inter predicted CUs from the motion compensation component 322 and the intra predicted CUs from the intra prediction component 324 based on the difference metrics of the CUs and the picture prediction mode provided by the mode selector component. The output of the selector switch 326, i.e., the predicted CU, is provided to a negative input of the combiner 302 and to a delay component 330. The output of the delay component 330 is provided to another combiner (i.e., an adder) 338. The combiner 302 subtracts the predicted CU from the current CU to provide a residual CU to the transform component 304. The resulting residual CU is a set of pixel difference values that quantify differences between pixel values of the original CU and the predicted CU.

The transform component 304 performs unit transforms on the residual CUs to convert the residual pixel values to transform coefficients and provides the transform coefficients to a quantize component 306. The quantize component 306 determines a QP for the transform coefficients of a residual CU and quantizes the transform coefficients based on that QP. For example, the quantize component 306 may divide the values of the transform coefficients by a quantization scale (Qs) derived from the QP value. In some embodiments, the quantize component 306 represents the coefficients by using a desired number of quantization steps, the number of steps used (or correspondingly the value of Qs) determining the number of bits used to represent the residuals. Other algorithms for quantization such as rate-distortion optimized quantization may also be used by the quantize component 306.

The quantize component 306 determines a QP for the residual CU transform coefficients based on the initial CU structure provided by the coding control component 340. That is, if the residual CU corresponds to a CU in the initial CU structure, then the quantize component 306 uses the QP computed for that CU by the rate control component 344. For example, referring to the example of FIG. 4, if the residual CU was generated from CU C with no further partitioning during the prediction processing, then the QP for CU C is used to quantize the residual CU.

Figures 6, 7:
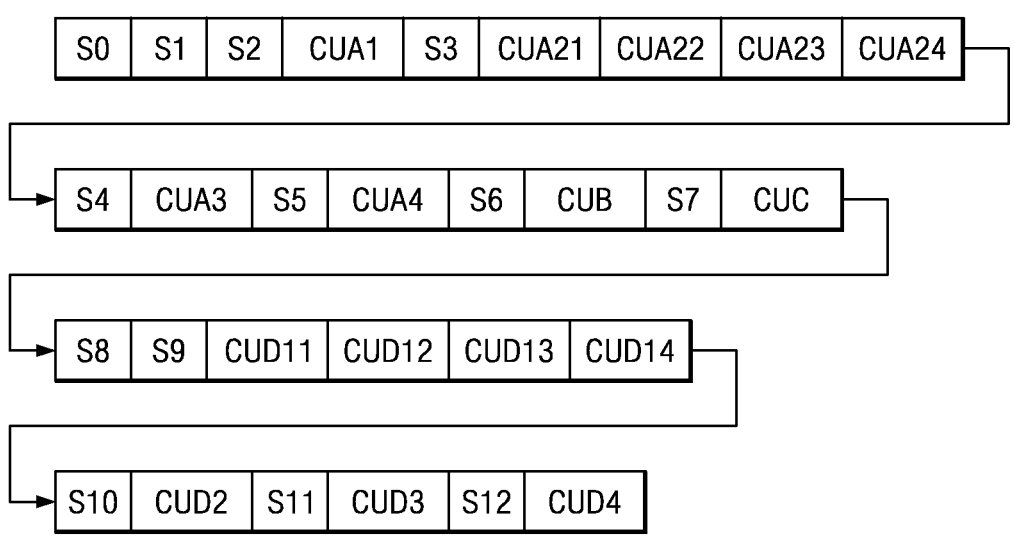

If the residual CU corresponds to a CU created during the prediction processing, then the quantize component 306 uses the QP of the original CU that was subdivided during the prediction processing to create the CU as the QP for the residual CU. For example, if CU C of FIG. 4 is further partitioned during the prediction processing as shown in FIG. 6, and the residual CU corresponds to one of CUs C1, C2, C3, or C4, then the QP for CU C is used to quantize the residual CU. In embodiments where a minimum QP CU size is specified, if the residual CU corresponds to a CU created in the initial CU structure and is smaller than the minimum QP CU size, then the quantize component 306 uses the QP of the original CU of the same size as the minimum QP CU that was partitioned by the rate control component 344 to create the CU. For example, in the LCU of FIG. 4, if the LCU size is 64×64 and the minimum QP CU size is 32×32 and the residual CU corresponds to one of the 8×8 CUs A21, A22, A23, or A24, then the QP for CU A2 is used to quantize the residual CU.

As was previously mentioned, the coding control component 340 may generate a quantization parameter array that is stored in the memory 346. The quantize component 306 may use this matrix to determine a QP for the residual CU coefficients. That is, the coordinates of the upper left corner of the CU corresponding to the residual CU, whether that CU is in the original coding structure or was added during the prediction process, may be used to locate the appropriate QP in the quantization parameter array. In general, the x coordinate may be divided by the width of the SCU and the y coordinate may be divided by the height of the SCU to compute the coordinates of the appropriate QP in the quantization parameter array.

For example, consider the CU structure 500 and the quantization parameter array 502 of FIG. 5. In this example, the SCU is 8×8. The coordinates of the upper left corner of CU A4 are (16, 16). Thus, the coordinates of the location in the quantization parameter array 502 holding the appropriate QP are (2, 2). Referring now to the CU structure of FIG. 6, recall that for this example C1, C2, C3, and C4 are assumed to be added to the CU structure during prediction processing. The coordinates of the upper left corner of CU C4 are (48, 16). Thus, the coordinates of the location in the quantization parameter matrix 502 holding the appropriate QP are (6, 2).

Because the DCT transform redistributes the energy of the residual signal into the frequency domain, the quantized transform coefficients are taken out of their scan ordering by a scan component 308 and arranged by significance, such as, for example, beginning with the more significant coefficients followed by the less significant. The ordered quantized transform coefficients for a CU provided via the scan component 308 along with header information for the CU are coded by the entropy encoder 334, which provides a compressed bit stream to a video buffer 336 for transmission or storage. The entropy coding performed by the entropy encoder 334 may be use any suitable entropy encoding technique, such as, for example, context adaptive variable length coding (CAVLC), context adaptive binary arithmetic coding (CABAC), run length coding, etc.

The entropy encoder 334 encodes information regarding the CU structure used to generate the coded CUs in the compressed bit stream and information indicating the QPs used in the quantization of the coded CUs. In some embodiments, the CU structure of an LCU is signaled to a decoder by encoding the sizes of the LCU and the SCU and a series of split flags in the compressed bit stream. If a CU in the recursive quadtree structure defined by the LCU and the SCU is split, i.e., partitioned, in the CU structure, a split flag with a value indicating a split, e.g., 1, is signaled in the compressed bit stream. If a CU is not split and the size of the CU is larger than that of the SCU, a split flag with a value indicating no split, e.g., 0, is signaled in the compressed bit stream. Information specific to the unsplit CU will follow the split flag in the bit stream. The information specific to a CU may include CU header information (prediction mode, motion vector differences, coding block flag information, etc), QP information, and coefficient information. Coefficient information may not be included if all of the CU coefficients are zero. Further, if the size of a CU is the same size as the SCU, no split flag is encoded in the bit stream for that CU.

FIG. 7 shows an example of signaling the CU structure of the LCU of FIG. 4 assuming that the LCU size is 64×64 and the SCU size is 8×8. This example assumes that all the CUs have at least one non-zero coefficient. In this example, split flag S0 is set to 1 to indicate that the LCU is split into four CUs: A, B, C, and D. Split flag S1 is set to 1 to indicate that CU A is split into four CUs: A1, A2, A3, and A4. Split flag S2 is set to 0 to indicate that CU A1 is not split. Information specific to CU A1 follows split flag S2. Split flag S3 is set to 1 to indicate that CU A2 is split into four CUs: A21, A22, A23, and A24. CUs A21, A22, A23, and A24 are 8×8 so no split flags are encoded for these CUs. Information specific to each of the CUS follows split flag S3. Split flag S4 is set to 0 to indicate that CU A3 is not split, and so on.

The entropy encoder 334 includes coded QP information for each coded CU in the compressed bit stream. In some embodiments, the entropy encoder 334 includes this QP information in the form of a delta QP value, i.e., the difference between a QP value and a predicted QP value. In some embodiments, the entropy encoder 334 computes a delta QP for a CU as dQP=QPcurr−QPprev where QPcurr is the QP value for the CU and QPprev is the QP value for the CU immediately preceding the CU in the scanning order, e.g., in depth-first Z scan order. In this case, QPprev is the predicted QP. For example, referring to FIG. 4, the delta QP for CU B is QPB−QPA4 and the delta QP for CU D2 is QPD2−QPD14. Computing a delta QP in this way may be desirable when rate control is not based on perceptual criteria.

In some embodiments, the entropy encoder 334 computes a value for delta QP as a function of the QP values of one or more spatially neighboring QPs. That is, delta QP=QPcurr−f(QPs of spatially neighboring CUs). In this case, f( ) provides the predicted QP value. Computing delta QP in this way may be desirable when rate control is based on perceptual criteria. Examples of the function f( ) include f( )=QP of a left neighboring CU and f( )=the average of the QP value for a left neighboring CU and the QP value of a top neighboring CU. More sophisticated functions of QPs of spatially neighboring CUs may also be used, including using the QP values of more than one or two neighboring CUs.

Within an LCU, spatially neighboring CUs of a CU may be defined as those CUs adjacent to the CU in the CU structure of the LCU. For example, in FIG. 4, CU A22, CU A24, and CU A4 are left neighboring CUs of CU B. Also, CU A23 and CU A24 are top neighboring CUs of CU A4. For CUs on the left and top edges of an LCU, adjacent CUs in an LCU to the left or above, respectively, of the LCU in a picture may be considered as left neighboring and top neighboring CUs, respectively.

In some embodiments, more than one mode for computing a predicted QP value for purposes of computing delta QP may be provided. For example, the entropy encoder 334 may provide two different modes for computing delta QP: dQP=QPcurr−QPprev and dQP=QPcurr−f(QPs of spatially neighboring CUs). That is, the entropy encoder 334 may compute a delta QP as per the following pseudo code:
If (qp_predictor_mode==1)
  deltaQP=(QP of current CU)−(QP of previous CU in coding order);
else if (qp_predictor_mode==2)
  deltaQP=(QP of current CU)−f(QP of spatially neighboring CUs)
where qp_predictor_mode is selected elsewhere in the video encoder. More than two modes for computing a delta QP value may be provided in a similar fashion. Further, the mode used to compute delta QPs, i.e., qp_predictor_mode, may be signaled in the compressed bit stream at the appropriate level, e.g., sequence, picture, slice, and/or LCU level.

Figure 8:
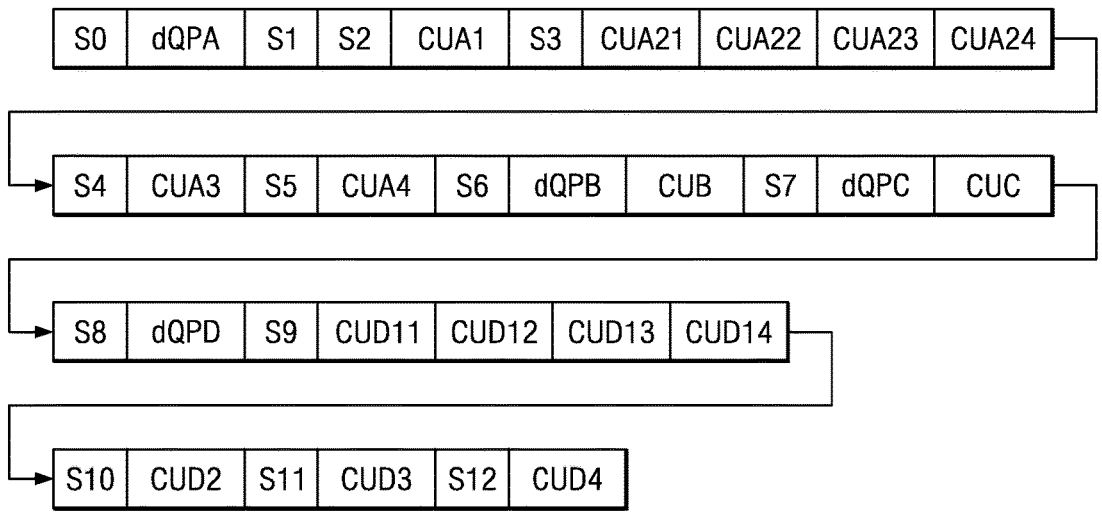

In some embodiments, the entropy encoder 334 encodes a delta QP value for each CU in the compressed bit stream. For example, referring to FIG. 7, a delta QP value would be included in the information specific to CU A1, in the information specific to CU A21, in the information specific to CU A22, etc. In some embodiments, if a minimum QP CU size is specified, a delta QP value is encoded in the CU specific information for each CU with at least one non-zero coefficient that is larger than or equal to the minimum QP CU in size. For those CUs smaller than the minimum QP CU, a delta QP is encoded at the non-leaf CU level. The size of the minimum QP CU is also encoded in the bit stream at the appropriate point. FIG. 8 shows an example of signaling delta QPs for the CU structure of the LCU of FIG. 4 assuming that the LCU size is 64×64, the SCU size is 8×8, the minimum QP CU size is 32×32, and each CU has at least one non-zero coefficient. Each of the CUs A, B, C, and D is 32×32, so delta QPs, designated dQPx, are signaled for those CUs and not for any of the smaller ones.

Referring again to FIG. 3B, inside the encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs estimated transformed information, i.e., an estimated or reconstructed version of the transform result from the transform component 304. In some embodiments, the QP for the CU is communicated to the dequantize component 312 by the quantize component 306. In some embodiments, the dequantize component 312 determines the QP from a quantization parameter array in the manner previously described. The estimated transformed information is provided to the inverse transform component 314, which outputs estimated residual information which represents a reconstructed version of a residual CU. The reconstructed residual CU is provided to the combiner 338.

The combiner 338 adds the delayed selected CU to the reconstructed residual CU to generate an unfiltered reconstructed CU, which becomes part of reconstructed picture information. The reconstructed picture information is provided via a buffer 328 to the intra prediction component 324 and to a filter component 316. The filter component 316 is an in-loop filter which filters the reconstructed frame information and provides filtered reconstructed CUs, i.e., reference data, to the storage component 318.

In some embodiments, the above described techniques for computing delta QPs may be used in other components of the video encoder. For example, if the quantize component uses rate distortion optimized quantization which minimizes total rate and distortion for a CU (Total rate=Rate of (dQP)+Rate for (CU)), one or both of these techniques may be used by these components to compute the needed delta QP values. In some embodiments, the QPs originally generated by the rate control component 344 may be adjusted up or down by one or more other components in the video encoder prior to quantization.

Figure 9:
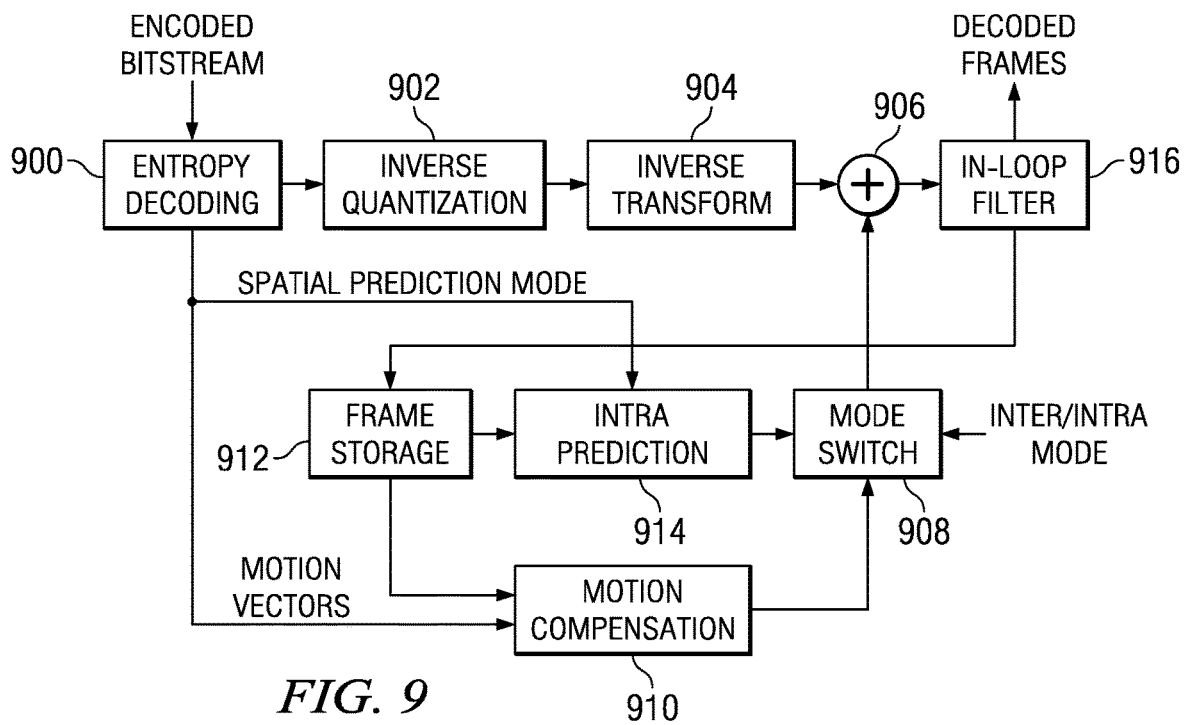
FIG. 9 shows a block diagram of a video decoder in accordance with one or more embodiments.

FIG. 9 shows a block diagram of a video decoder, e.g., the video decoder 112, in accordance with one or more embodiments of the invention. The video decoder operates to reverse the encoding operations, i.e., entropy coding, quantization, transformation, and prediction, performed by the video encoder of FIGS. 3A and 3B to regenerate the frames of the original video sequence. In view of the above description of a video encoder, one of ordinary skill in the art will understand the functionality of components of the video decoder without detailed explanation.

In the video decoder of FIG. 9, the entropy decoding component 900 receives an entropy encoded video bit stream and reverses the entropy encoding to recover the encoded CUs and the encoded CU structures of the LCUs. The decoded information is communicated to other components in the video decoder as appropriate. The entropy decoding performed by the entropy decoding component 900 may include detecting coded QP values in the bit stream and decoding them for communication to the inverse quantization component 902. In some embodiments, the entropy decoding component 900 may detect delta QP values in the bit stream and compute reconstructed QP values from the delta QP values for communication to the inverse quantization component 902. For example, if the video encoder computed a delta QP as QPcurr−QPprev where QPprev is the QP of the previous CU in the coding order, the entropy decoding component 900 computes QP as the delta QP+QPprev, where QPprev is the reconstructed QP computed by the entropy decoding component 900 for the immediately preceding CU in the bit stream. For this computation, the entropy decoding component 900 may store and update a value for QPprev as each encoded CU is entropy decoded and a reconstructed QP is determined for that CU.

If the video encoder computed a delta QP as QPcurr−f (QPs of spatially neighboring CUs), the entropy decoding component 900 computes a reconstructed QP as the delta QP+f(rQPs of spatially neighboring CUs), where rQP is a reconstructed QP. Further, if the video encoder supports multiple modes for computing a delta QP, the video decoder will compute a reconstructed QP from the delta QP according to the mode signaled in the bit stream.

To perform the computation delta QP=QPcurr−f(rQPs of spatially neighboring CUs), the entropy decoding component 900 may store the reconstructed QPs of the appropriate spatially neighboring CUs. For example, the reconstructed QPs of the neighboring CUs may be stored in a reconstructed quantization parameter array in a manner similar to that of the previously described quantization parameter array.

Figure 10:
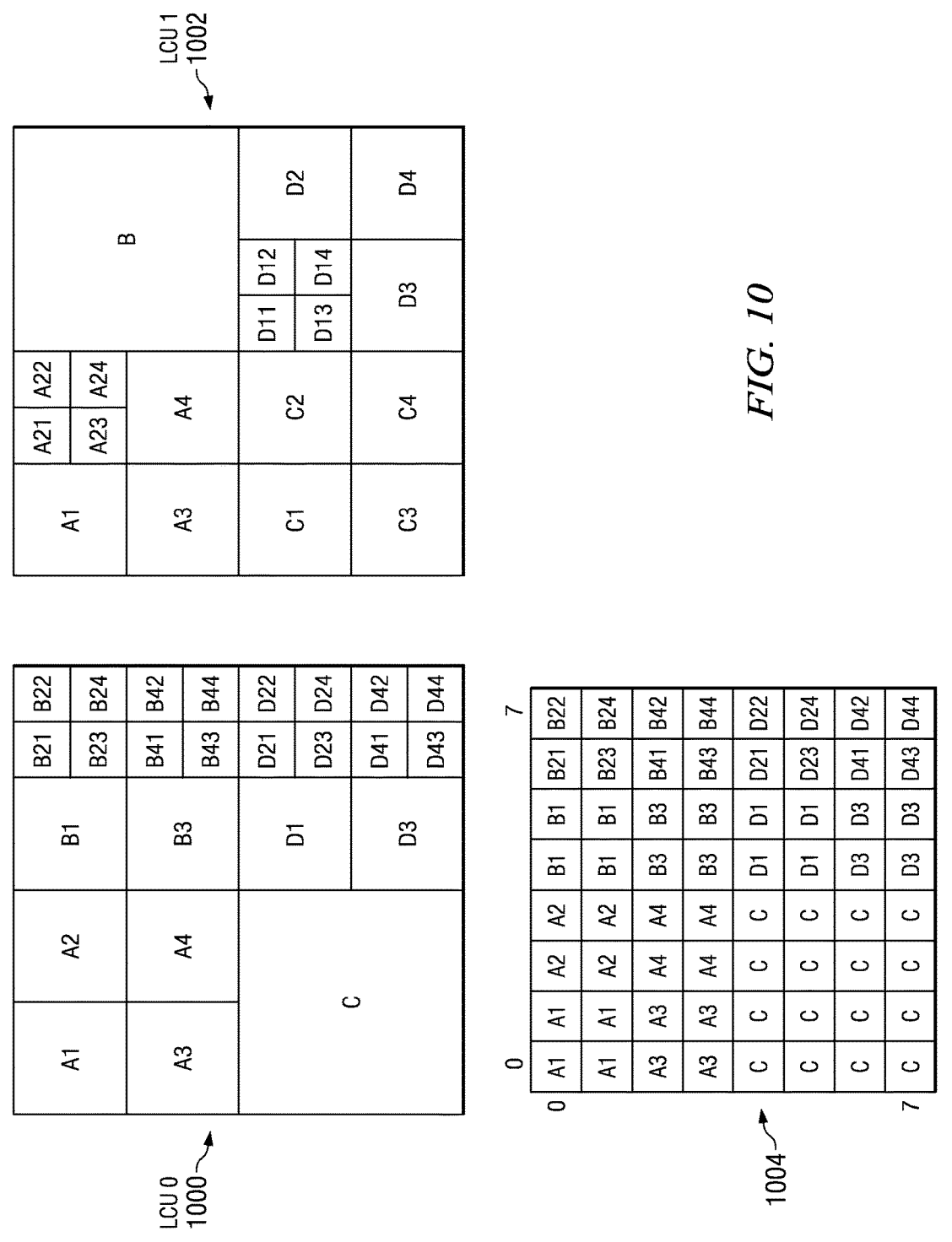

Example reconstructed QP calculations are described below assuming f( ) is equal to the rQP of the left neighboring CU and in reference to the example LCU structures 1000 and 1002 in FIG. 10. In this example, LCU 0 1000 has been decoded and its reconstructed QPs are stored in the reconstructed quantization parameter array 1004. As reconstructed QPs are computed for LCU 1 1002, they may be stored in a reconstructed quantization parameter array for that LCU. The following calculations demonstrate how reconstructed QP values for some of the CUs in LCU 1 1002 may be reconstructed from left neighboring CUs:

$$rQP(A1)=dQP(A1)+rQP(B22 \text{ of LCU 0 1000})$$

$$rQP(A21)=dQP(A21)+rQP(A1)$$

$$rQP(A22)=dQP(A22)+rQP(A21)$$

$$rQP(A23)=dQP(A23)+rQP(A1)$$

$$rQP(A24)=dQP(A24)+rQP(A23)$$

$$rQP(A3)=dQP(A3)+rQP(B42 \text{ of LCU 0 1000})$$

$$rQP(A4)=dQP(A4)+rQP(A3)$$

In this example, the left column of the reconstructed quantization parameter array 1004 (B22, B24, B42, B44, D22, D24, D42, D44) is all that is required for applying predictor f( ) to LCU 1 1002. If the left neighboring CU is not available as can be the case for the first LCU in a picture, a predefined QP value may be used or the reconstructed QP value in CU coding order may be used.

Referring again to FIG. 9, the inverse quantization component 902 de-quantizes the residual coefficients of the residual CUs based on the reconstructed QP values. The inverse transform component 904 transforms the frequency domain data from the inverse quantization component 902 back to residual CUs. That is, the inverse transform component 904 applies an inverse unit transform, i.e., the inverse of the unit transform used for encoding, to the de-quantized residual coefficients to produce the residual CUs.

A residual CU supplies one input of the addition component 906. The other input of the addition component 906 comes from the mode switch 908. When inter-prediction mode is signaled in the encoded video stream, the mode switch 908 selects a prediction block from the motion compensation component 910 and when intra-prediction is signaled, the mode switch selects a prediction block from the intra prediction component 914. The motion compensation component 910 receives reference data from storage 912 and applies the motion compensation computed by the encoder and transmitted in the encoded video bit stream to the reference data to generate a predicted CU. The intra-prediction component 914 receives previously decoded predicted CUs from the current picture and applies the intra-prediction computed by the encoder as signaled by a spatial prediction mode transmitted in the encoded video bit stream to the previously decoded predicted CUs to generate a predicted CU.

The addition component 906 generates a decoded CU, by adding the selected predicted CU and the residual CU. The output of the addition component 906 supplies the input of the in-loop filter component 916. The in-loop filter component 916 smoothes artifacts created by the block nature of the encoding process to improve the visual quality of the decoded frame. The output of the in-loop filter component 916 is the decoded frames of the video bit stream. Each decoded CU is stored in storage 912 to be used as reference data.

In some embodiments, unit transforms smaller than a CU may be used. In such embodiments, the video encoder may further partition a CU into transform units. For example, a CU may be partitioned into smaller transform units in accordance with a recursive quadtree structure adapted to the CU size. The transform unit structure of the CU may be signaled to the decoder in a similar fashion as the LCU CU structure using transform split flags. Further, in some such embodiments, delta QP values may be computed and signaled at the transform unit level. In some embodiments, a flag indicating whether or not multiple quantization parameters are provided for an LCU may be signaled at the appropriate level, e.g., sequence, picture, and/or slice.

Figure 11:
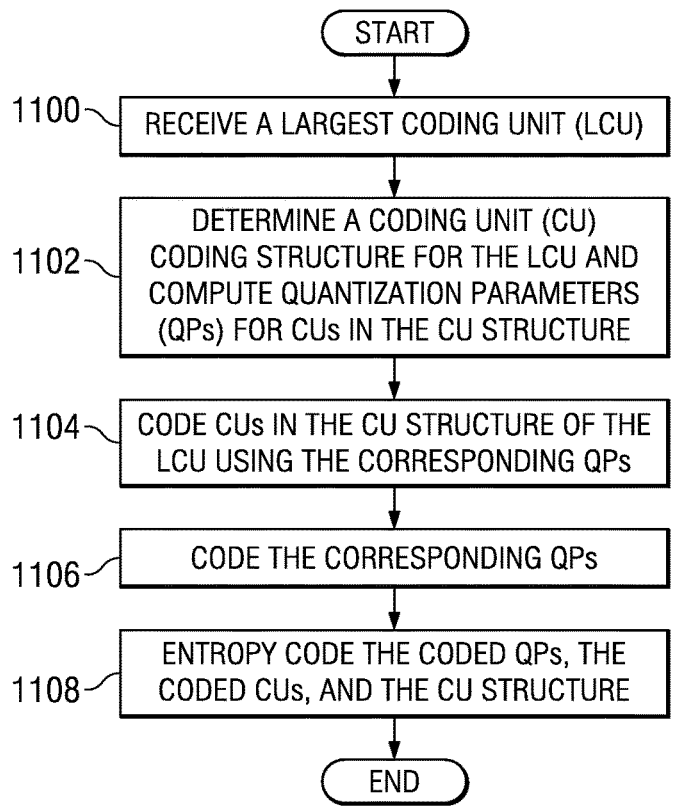
FIGS. 11 and 12 show flow diagrams of methods in accordance with one or more embodiments.

FIG. 11 is a flow diagram of a method for generating and encoding multiple quantization parameters for an LCU in a video encoder in accordance with one or more embodiments. Initially, an LCU is received 1100. Various criteria are then applied to the LCU to determine a CU structure for the LCU and QPs are computed for the CUs in the CU structure 1102. For example, as previously discussed, the LCU may be divided into CUs of various sizes within a recursive quadtree structure based on the various criteria to determine the granularity at which QP values should be applied, i.e., to determine the CU structure for the LCU. A quantization parameter is then computed for each CU in the CU structure.

CUs in the CU structure are then coded using the corresponding QPs 1104. For example, a block-based coding process, i.e., prediction, transformation, and quantization, is performed on each CU in the CU structure. The prediction, transformation, and quantization may be performed on each CU as previously described herein.

The QPs used in coding the CUs are also coded 1106. For example, to signal the QPs used in coding the CUs, delta QPs may be computed. The delta QP values may be computed as previously described. The coded QPs, the coded CUs, and the CU structure are then entropy coded to generate a portion of the compressed bit stream 1108. The coded QPs, coded CUs, and the CU structure may be signaled in the compressed bit stream as previously described herein.

Figure 12:
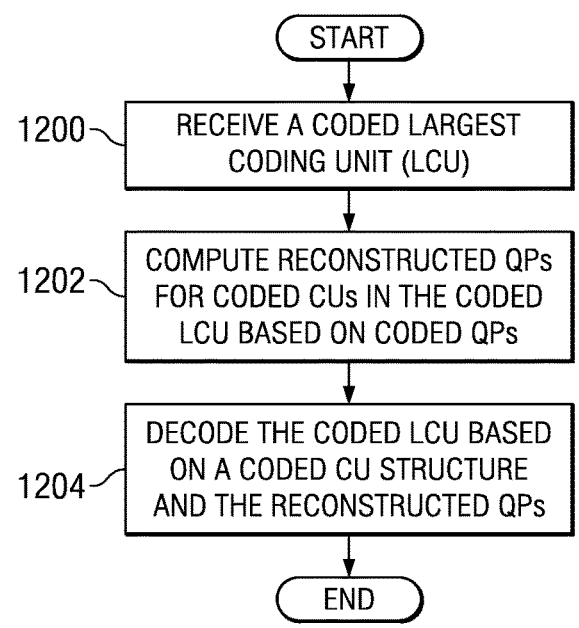

FIG. 12 is a flow diagram of a method for decoding multiple quantization parameters for an LCU in a video decoder in accordance with one or more embodiments. Initially, a coded LCU that may include a coded CU structure and coded QPs is received 1200. The coded CU structure and the coded QPs may be generated by a video encoder as previously described. Reconstructed QPs for coded CUs in the coded LCU are then computed based on the coded QPs 1202. The reconstructed QPs may be computed as previously described. The coded LCU is then decoded based on the coded CU structure and the reconstructed QPs 1204. For example, coded coding units in the coded LCU may be decoded using a block-based decoding process as previously described herein that reverses a block-based coding process used by the video encoder.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device, and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 13:
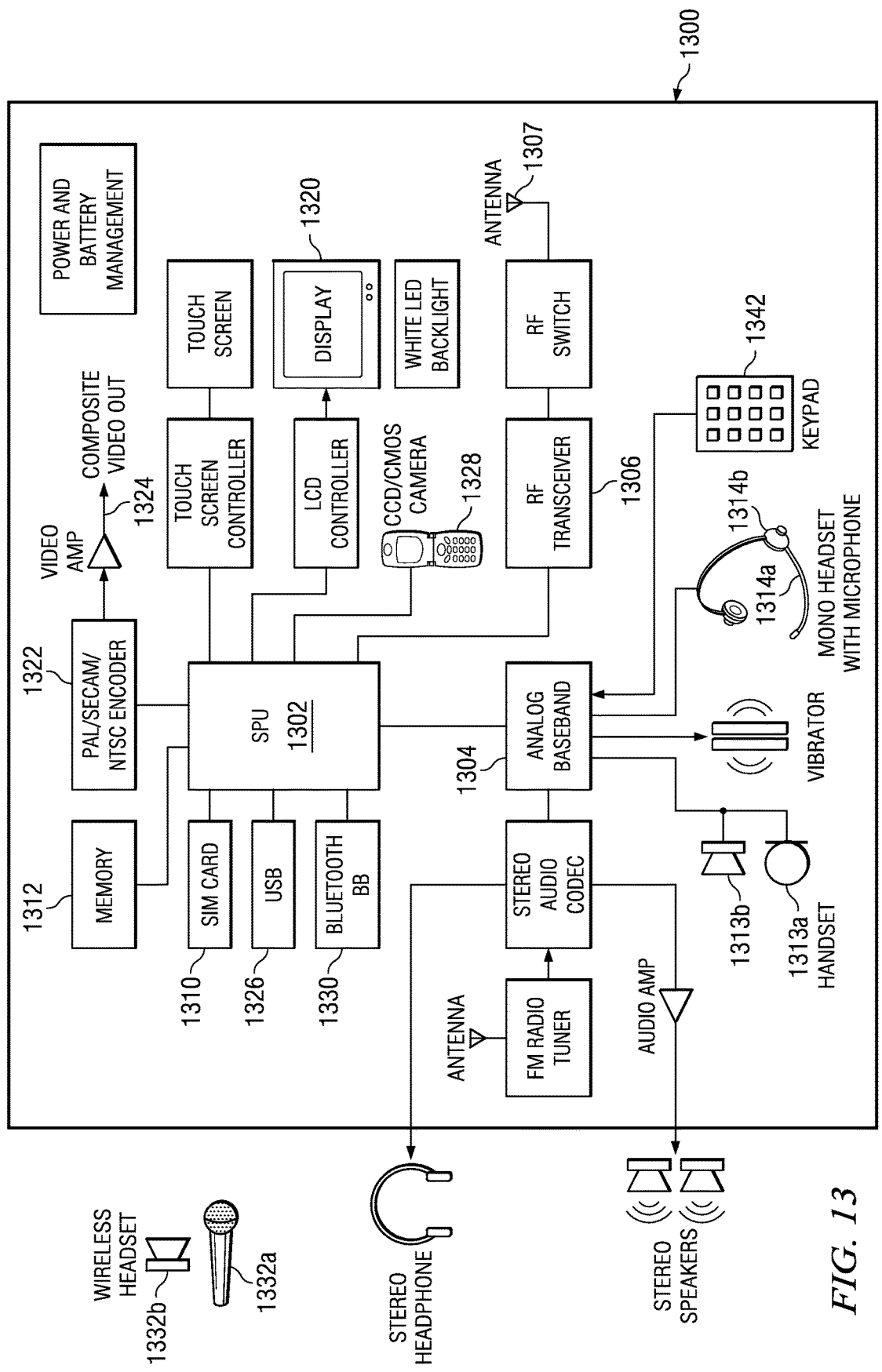
FIG. 13 shows a block diagram of an illustrative digital system in accordance with one or more embodiments.

Embodiments of the methods and encoders as described herein may be implemented for virtually any type of digital system (e.g., a desk top computer, a laptop computer, a handheld device such as a mobile (i.e., cellular) phone, a personal digital assistant, a digital camera, etc.). FIG. 13 is a block diagram of a digital system (e.g., a mobile cellular telephone) 1300 that may be configured to use techniques described herein.

As shown in FIG. 13, the signal processing unit (SPU) 1302 includes a digital signal processing system (DSP) that includes embedded memory and security features. The analog baseband unit 1304 receives a voice data stream from handset microphone 1313*a* and sends a voice data stream to the handset mono speaker 1313*b*. The analog baseband unit 1304 also receives a voice data stream from the microphone 1314*a* and sends a voice data stream to the mono headset 1314*b*. The analog baseband unit 1304 and the SPU 1302 may be separate ICs. In many embodiments, the analog baseband unit 1304 does not embed a programmable processor core, but performs processing based on configuration of audio paths, filters, gains, etc being setup by software running on the SPU 1302.

The display 1320 may also display pictures and video sequences received from a local camera 1328, or from other sources such as the USB 1326 or the memory 1312. The SPU 1302 may also send a video sequence to the display 1320 that is received from various sources such as the cellular network via the RF transceiver 1306 or the camera 1326. The SPU 1302 may also send a video sequence to an external video display unit via the encoder unit 1322 over a composite output terminal 1324. The encoder unit 1322 may provide encoding according to PAL/SECAM/NTSC video standards.

The SPU 1302 includes functionality to perform the computational operations required for video encoding and decoding. In one or more embodiments, the SPU 1302 is configured to perform computational operations for applying one or more techniques for generating and encoding multiple quantization parameters for an LCU during the encoding process as described herein. Software instructions implementing the techniques may be stored in the memory 1312 and executed by the SPU 1302, for example, as part of encoding video sequences captured by the local camera 1328. In some embodiments, the SPU 1302 is configured to perform computational operations for applying one or more techniques for decoding multiple quantization parameters for an LCU as described herein as part of decoding a received coded video sequence or decoding a coded video sequence stored in the memory 1312. Software instructions implementing the techniques may be stored in the memory 1312 and executed by the SPU 1302.

The steps in the flow diagrams herein are described in a specific sequence merely for illustration. Alternative embodiments using a different sequence of steps may also be implemented without departing from the scope and spirit of the present disclosure, as will be apparent to one skilled in the relevant arts by reading the disclosure provided herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of encoding video comprising:
   dividing a portion of a picture into a plurality of non-over-lapping blocks;
   determining a minimum quantization-parameter-coding-unit size for the plurality of non-over-lapping blocks for which a first quantization parameter will be determined;
   determining a quantization parameter for a first region formed from at least one of the plurality of non-over-lapping blocks;
   determining a predicted quantization parameter for the first region by finding an average value of a quantization parameter of an immediate left neighboring non-over-lapping block of the first region and a quantization parameter of an immediate top neighboring non-over-lapping block of the first region;
   determining a delta quantization parameter for the first region that is related to a difference between the quantization parameter of the first non-over-lapping block and the predicted quantization parameter of the first non-over-lapping block;
   encoding the delta quantization parameter into a bit stream if the size of the first region is greater than or equal to the minimum quantization-parameter-coding-unit size; and
   encoding the quantization-parameter-coding-unit size into the bit stream at a picture level.

2. The method of claim 1 further comprising applying the determined quantization parameter for the first region to quantize the first region.

3. A method of decoding an encoded video bit stream, comprising:
   decoding the encoded video bit stream resulting in a plurality of reconstructed non-over-lapping blocks for a picture;
   extracting a minimum quantization-parameter-coding-unit size for a first region from the decoded bit stream at a picture level;
   extracting a delta quantization parameter for the first region from the decoded video bit stream where the size of the first region is greater than or equal to the minimum quantization-parameter-coding-unit size;
   determining a predicted quantization parameter for the first region by finding an average value of a quantization parameter of an immediate left neighboring reconstructed non-over-lapping block of the first region and an immediate quantization parameter of a top neighboring reconstructed non-over-lapping block of the first region;

determining a quantization parameter for the first region that is related to the sum of the delta quantization parameter of the first region and the predicted quantization parameter of the first region; and performing an inverse quantization function on the first region using the quantization parameter determined for the first region; and performing an inverse transform function on said first region to form a first reconstructed non-over-lapping block after performing the inverse quantization function on the first region.

4. The method of claim 3 further comprising applying an in-loop filter to said first reconstructed non-overlapping block.

5. The method of claim 4 further comprising displaying the picture.

6. A video decoding system, comprising:

an entropy decoding component coupled to an inverse quantization component and an inverse transform component coupled to the inverse quantization component together configured to:

decode an encoded video bit stream and form a plurality of reconstructed non-over-lapping blocks for a picture;

the entropy decoding component further configured to:

extract a minimum quantization-parameter-coding-unit size for a first region from the decoded bit stream at a picture level;

extract a delta quantization parameter for the first region from the decoded video bit stream where the size of the first region is greater than or equal to the minimum quantization-parameter-coding-unit size;

determine a predicted quantization parameter for the first region by finding an average value of a quantization parameter of a left neighboring reconstructed non-over-lapping block of the first region and a quantization parameter of a top neighboring reconstructed non-over-lapping block of the first region;

determine a quantization parameter for the first region that is related to the sum of the delta quantization parameter of the first region and the predicted quantization parameter of the first region;

the inverse quantization component further configured to perform an inverse quantization function on the first region using the quantization parameter determined for the first region;

the inverse transform component further configured to perform an inverse transform function on said first region to form a first reconstructed non-over-lapping block; and an in-loop filter component coupled to said inverse transform component and configured to filter said first reconstructed non-over-lapping block.

7. The video decoding system of claim 6 further comprising a display coupled to the in-loop filter configured to display the picture.

8. The video decoding system of claim 6 wherein the entropy decoding component, the inverse quantization component and the in-loop filter component are all implemented in a processing unit that comprises a digital signal processor (DSP), embedded memory and security features.

9. The video decoding system of claim 6 wherein the entropy decoding component, the inverse quantization component and the in-loop filter component are all implemented in a system comprising a software program being executed in one or more processors wherein the software program is stored in a memory and loaded from the memory into the one or more processors prior to being executed by the one or more processors.

10. A video system, comprising:

an entropy decoding component coupled to an inverse quantization component and an inverse transform component coupled to the inverse quantization component together configured to:

decode an encoded video bit stream and form a plurality of reconstructed non-over-lapping blocks for a picture;

the entropy decoding component further configured to:

extract a minimum quantization-parameter-coding-unit size for a first region from the decoded bit stream at a picture level;

extract a delta quantization parameter for a first region from the decoded video bit stream where the size of the first region is greater than or equal to the minimum quantization-parameter-coding-unit size;

determine a predicted quantization parameter for the first region by finding an average value of a quantization parameter of a left neighboring reconstructed non-over-lapping block of the first region and a quantization parameter of a top neighboring reconstructed non-over-lapping block of the first region;

determine a quantization parameter for the first region that is related to the sum of the delta quantization parameter of the first region and the predicted quantization parameter of the first region;

the inverse quantization component further configured to perform an inverse quantization function on the first region using the quantization parameter determined for the first region;

the inverse transform component further configured to perform an inverse transform function on said first region to form a first reconstructed non-over-lapping block;

an in-loop filter component coupled to said inverse transform component and configured to filter said first reconstructed non-over-lapping block; and a display coupled to the in-loop filter configured to display the picture.

11. The video system of claim 10 wherein the entropy decoding component, the inverse quantization component, the inverse transform component and the in-loop filter component are all implemented in a processing unit that comprises a digital signal processor (DSP) and embedded memory.

12. The video system of claim 10 wherein the entropy decoding component, the inverse quantization component and the in-loop filter component are all implemented in a system comprising a software program being executed in one or more processors wherein the software program is stored in a memory and loaded from the memory into the one or more processors prior to being executed by the one or more processors.

13. The video system of claim 10 wherein the entropy decoding component, the inverse quantization component and the in-loop filter component are all implemented in a signal processing unit that is further coupled to a transceiver and an antenna.

14. The video system of claim 13 wherein the signal processing unit is further coupled to a touch screen controller and a touch screen.

15. The video system of claim 14 wherein the signal processing unit is further coupled to an analog baseband that is coupled to an antenna.

16. The video system of claim 10 wherein the display is a liquid crystal display or a light emitting diode display.

17. The video system of claim 11 wherein the display is a liquid crystal display or a light emitting diode display.

18. The video system of claim 12 wherein the display is a liquid crystal display or a light emitting diode display.

* * * * *

UNITED STATES PATENT AND TRADEMARK OFFICE
CERTIFICATE OF CORRECTION

PATENT NO. : 9,635,364 B2
APPLICATION NO. : 14/531632
DATED : April 25, 2017
INVENTOR(S) : Minhua Zhou, Mehmet Demircin and Madhukar Budagavi It is certified that error appears in the above-identified patent and that said Letters Patent is hereby corrected as shown below:

In the Claims

In Column 17, Line 7, in Claim 3 delete "and".

In Column 18, Line 16, in Claim 10 replace "a first region" with -- the first region --.

Signed and Sealed this
Nineteenth Day of November, 2019

Andrei Iancu
*Director of the United States Patent and Trademark Office*